United States Patent [19]
Travis et al.

[11] Patent Number: 5,110,198
[45] Date of Patent: May 5, 1992

[54] EYE WEAR WITH INTERLOCKING FRAME SECTIONS

[76] Inventors: Beth R. Travis; Darin P. Travis, both of 21213B Hawthorne Blvd., #5416, Torrance, Calif. 90509

[21] Appl. No.: 527,428
[22] Filed: May 23, 1990
[51] Int. Cl.⁵ .......................... G02C 5/02; G02C 5/14
[52] U.S. Cl. .................................. 351/124; 351/121; 351/149
[58] Field of Search .................. 351/63, 86, 124, 128, 351/133, 140, 149, 156, 121, 153; 16/228

[56] References Cited
U.S. PATENT DOCUMENTS 4,129,362 12/1978 Lorenzo .
4,377,327 3/1983 Zomer ............................ 351/121
4,610,519 9/1986 Hyman .
4,756,612 7/1988 Hyman .

Primary Examiner—Rodney B. Bovernick
Attorney, Agent, or Firm—Charles H. Thomas

[57] ABSTRACT

A set of spectacles has a lens frame formed of a pair of releasably interlocking lens holding sections. Each lens holding section is adapted to hold a single lens and has a hinge connection on one side and a set of knuckles on the other side. The knuckles in each of the lens sections interlock with the knuckles in the other lens section to releasably join the lens sections together. A pair of primary hinge pin members couple the temple pieces to the lens holding sections. The primary hinge pin members are removable. The spectacles also include at least one spare hinge pin member removably seated in a receptacle defined in one of the temple pieces. At least one of the hinge pin members is provided with a decorative, exposed shield.

13 Claims, 2 Drawing Sheets

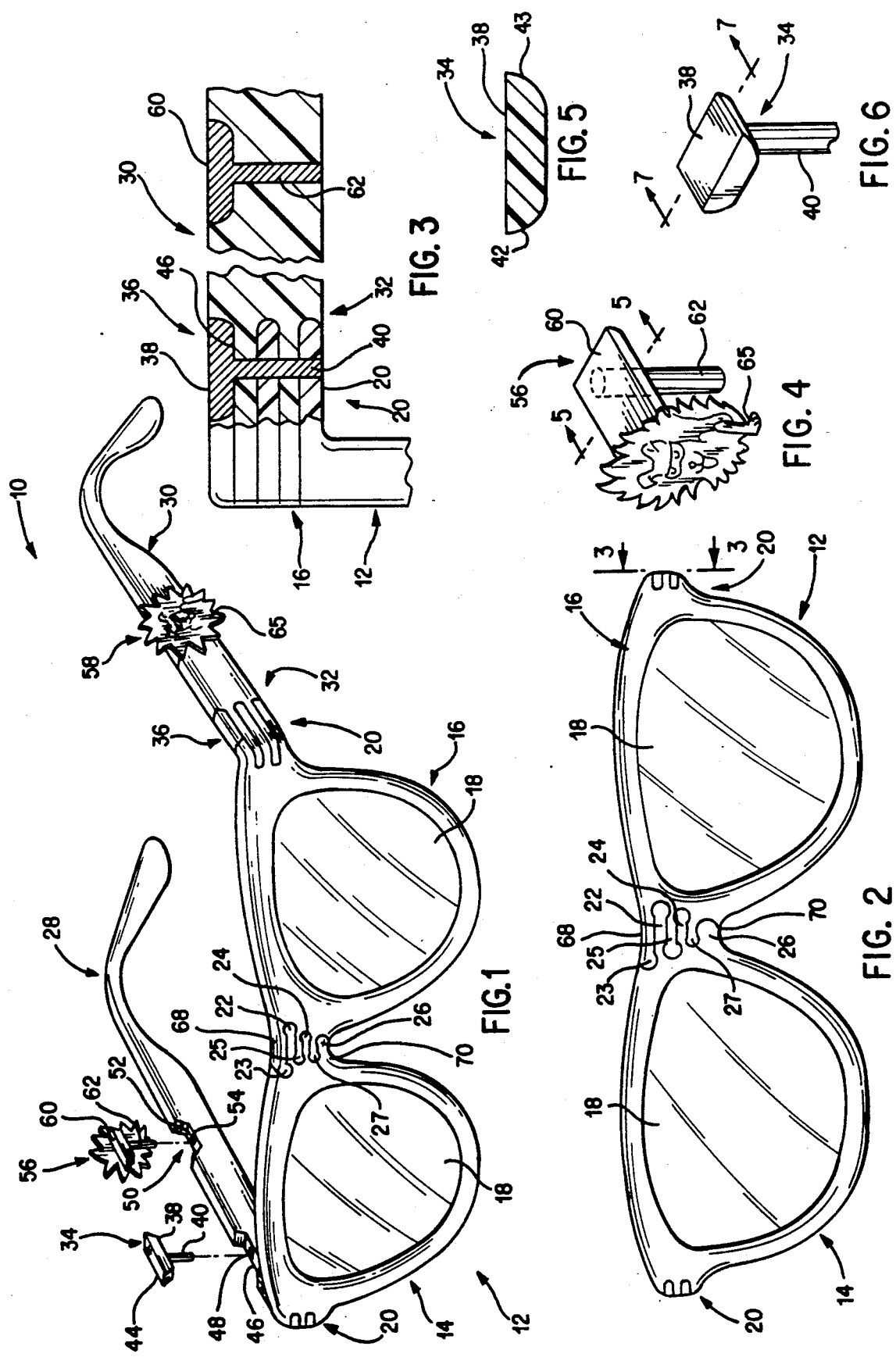

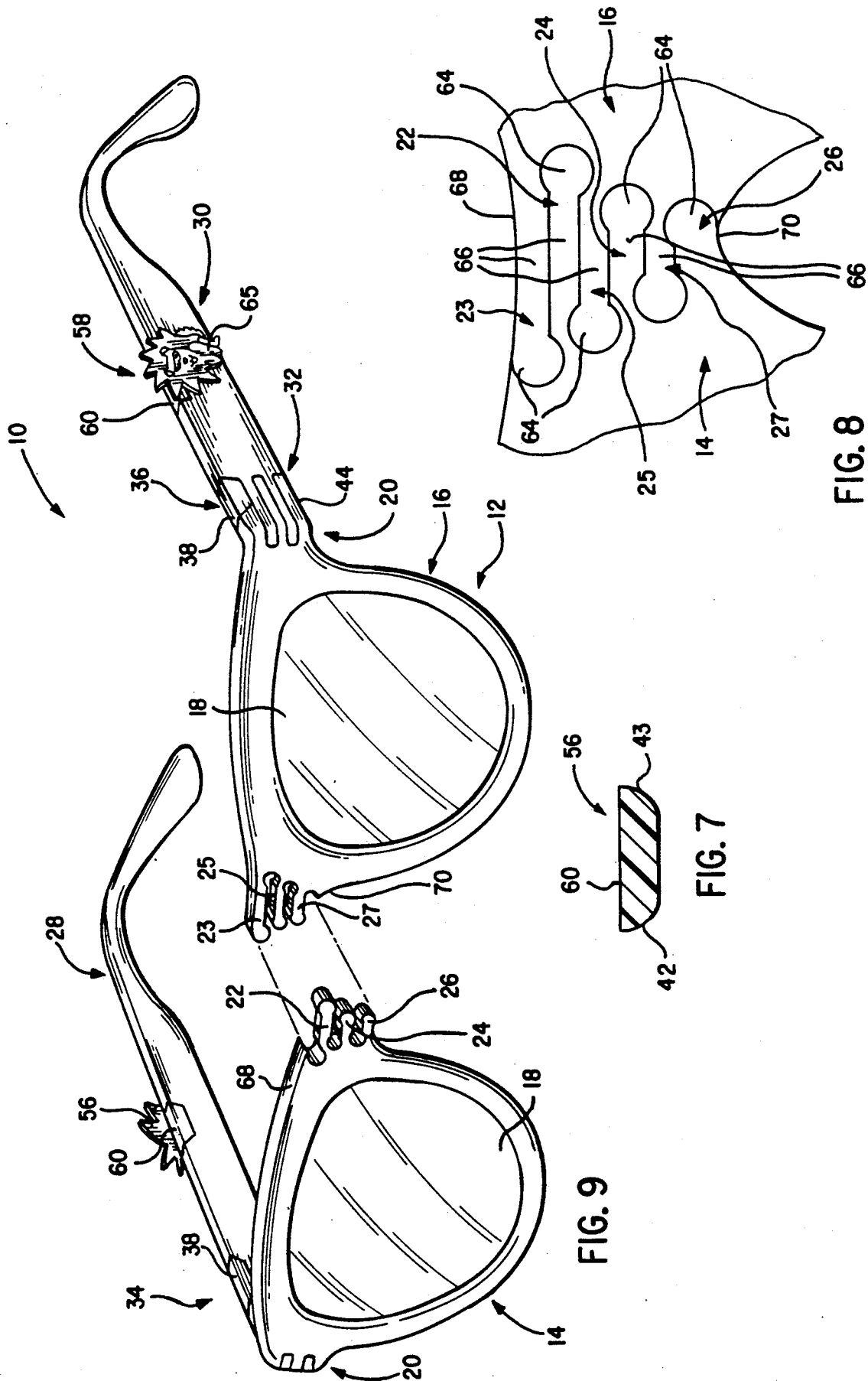

EYE WEAR WITH INTERLOCKING FRAME SECTIONS

BACKGROUND OF THE INVENTION

1. Field of the Invention

The present invention relates to an improved form of eyeglass construction.

2. Description of the Prior Art

In the past, various configurations of eye wear construction have been devised. Different types of eye wear frames have been configured to allow the eye wear to fold and to separate both at hinge connections between the temple pieces and the lens frame, and between adjacent sections of the lens frame itself. However, all of these prior systems have been unduly complex and have failed to provide modular, interchangeable eyeglass parts that are mechanically simple in construction, while remaining extremely versatile in function and which are also safe for the user to wear.

For example, U.S. Pat. No. 4,798,455 discloses user configurable novelty sunglasses comprised of detachable frame holding sections for each lens and separable temple pieces. While the sunglasses so formed do employ modular components, the interlocking mechanism employed on both sides of each lens section presents sharp edges and corners which could cause severe eye injury to a wearer resulting from sudden separation of the component pieces. For example, serious injury to a person's eye could easily result if a person wearing such sunglasses were to be struck in the face by a volleyball or beach ball. Also, the temple pieces of these prior art glasses are not joined to the eye frames by means of hinged connections, thus requiring total disassembly of the sunglasses into separate pieces for convenient transport and storage.

U.S. Pat. No. 4,756,612 is directed to a detachable eyeglass or sunglass assembly having left and right frame members for the left and right lenses. One of the frame members is provided with projecting pins which frictionally engage corresponding holes in the other frame member. Again, however, the pins or prongs are of such a sharp, projecting nature as to present a risk of serious eye injury in the event of an impact against the glasses that causes separation of the lens holding sections.

U.S. Pat. No. 4,129,362 discloses a pair of glasses having left and right lens holding portions which are joined by a nose piece that includes a male portion sized to be snugly received within a female socket. The single, prong-like male portion does present a safety hazard to the eyes of a wearer.

Conventional prior art eyeglasses or sunglasses of the type described also do not provide any replacement hinge pin members. Due to the repeated stress exerted upon the hinge pin members that join the eyeglass lens sections to the temple pieces, hinge pin members were for many years constructed of steel, even though such a construction adds considerably to the cost of eye wear. This is because the steel hinge elements must be physically secured to the frame members and to temple pieces, which are often constructed of plastic.

On the other hand, in those spectacles and eyeglass which employ plastic hinge pins, shearing of the hinge pins frequently occurs and the glasses cannot be used until replacement constructural components containing substitute hinge pin members have been procured and assembled with the remaining portions of the spectacles or sunglasses. That is, in conventional eyeglass and sunglasses which employ plastic pin stubs on the temple pieces that fit into corresponding sockets on the eye frame pieces, failure of the small, hinge pin stubs requires the replacement of the entire temple piece. A user cannot utilize the eyeglasses or sunglasses until a substitute temple piece has been purchased. Thus, the hinge pin members of conventional eyeglasses or sunglasses that are constructed entirely of plastic are both prone to failure and are not immediately repairable.

SUMMARY OF THE INVENTION

The present invention is directed to a form of eyeglass construction in which the eyeglass parts are formed with interleaved couplings, including especially an interlocking construction at the center of the frame across the bridge of the wearer's nose. The eyeglasses are each formed of four main separate pieces plus a pair of primary hinge pin members which are assembled by the user following purchase. Specifically, these pieces will include left and right-hand temples or bows and left and right-hand eyepiece holding sections. The two eyepiece holding sections are joined across the bridge of the nose by sets of knuckles in interleaved engagement. The interleaved engagement is preferably interlocking and includes a tight, rigid, friction fit.

The eye wear of the invention provides for the modular replacement of any broken portion of the frame. For example, if a left eyepiece frame were to become broken, the user would not have to purchase an entirely new set of eyeglass frames. Rather, the user could merely purchase a modular replacement left eyepiece frame. The broken eyepiece frame could then be disengaged from the interlocking connections and the new replacement left eyepiece frame could be inserted in place thereof.

Apart from the convenience of modular replacement of parts, the eye wear construction of the invention allows a user to choose from among alternative, modular parts in initially choosing a set of sunglasses or eye wear on the basis of fashion. While a complete set of left and right temple pieces and left and right lens sections can be sold as a unit, the component parts can also be marketed separately in different colors and styles. The components can be assembled in all one color to provide the user with a refined look, yet the user still has the advantage of readily replaceable parts. On the other hand, components of different colors can be chosen to compliment different clothing worn by the user. The eye wear components can be color coordinated to achieve both economy of purchase and fashion consciousness.

The lens sections of the eye wear of the invention preferably employ lenses of optical quality which will minimize distortion and offer a full range of ultraviolet protection. Because the lenses are of relative high quality, the interchangeability of the eye wear components offers a significant economic advantage to the user. The configuration of the components is mechanically simple and the overall shape is of a classical design with a broad appeal to the general public.

An important aspect of the construction of the lens sections is the knuckle configuration by which the lens sections are connected together. The knuckles are interleaved and preferably have an interlocking configuration, but are rounded at their tips. Therefore, these knuckles are potentially less injurious than connecting arrangements used in prior art devices. Those conventional lens holding section connectors employ sharply projecting appendages for interconnection. On the other hand, even if the lens holding sections of the invention are separated by the impact of a ball or by incidental contact with another person or object, the smooth rounded configuration of the tips of the knuckles creates a low likelihood of eye injury to the wearer.

Also, the sets of knuckles which interconnect the lens holding sections together are preferably recessed slightly from the arcuate curve of the portions of the lens holding sections that pass over the eyes. That is, the bridge between the lens holding sections formed by the interconnecting knuckles is slightly concave upwardly for both comfort and extended wearability.

Another aspect of the invention is the use of a combination hinge pin and decorative shield or medallion as either a primary hinge pin member for joining a temple to a lens section or as a spare hinge pin member. The spare hinge pin is seated in a recess in the bow or temple portion of the eye wear. Both the primary hinge pin members and the spare hinge pin are preferably constructed of plastic and are formed with a relatively broad base from which a cylindrical pin or axle extends downwardly. The projecting pin of the spare hinge pin member extends vertically downwardly into an opening in the structure of the eyeglass temple piece. That is, the eyeglass temple piece is provided with two recesses in its upper surface. One of the recesses receives the base of the primary hinge pin members while the other recess receives the base of the spare hinge pin member. The rod or pin of the primary hinge pin member extends downwardly through openings in the knuckles on the temple piece and through openings in the knuckles that extend rearwardly from the lens frame.

Any or all of the hinge pin members may be formed with a decorative shield and a cross connecting piece that carries the shield alongside the outside surface of the temple. The cross connecting piece for such a hinge pin member connects the pin of the hinge pin member to the decorative shield and also serves as the hinge pin base. The cross connecting piece seats in the recesses in the temple piece. The cross connecting piece carries a flat, plate-like shield structure that faces outwardly away from the temples and away from the eye wear in general. The edges of the shield may be configured to achieve a desired decorative effect. A logo or decorative design may be imprinted or molded onto the flat, shield.

An important feature of the eye wear of the invention is that the spare hinge pin member can be carried in the temple piece, seemingly forming a part thereof. However, the spare hinge pin member can be substituted for the functioning hinge pin portion of one of the primary hinge pin members, if that structure should break. The spare hinge pin has a base which seats in the other recess in the temple, to the rear of the primary hinge pin member. The spare hinge pin has a hinge pin rod that extends vertically downwardly into a cylindrical well defined in the structure of the temple or bow.

Should the primary hinge pin member break, the spare hinge pin member can be removed from its position and seated in the corresponding recess intended for the primary hinge pin member directly over the knuckles of the joint between the lens section frame and the temple piece. The user is thus provided with a spare hinge pin. The base of the broken primary hinge pin member can thereupon be seated in the recess in the temple originally designed to accommodate the spare hinge pin, thus preserving the aesthetic appearance of the eye wear. The invention thus provides a spare hinge pin which is carried in the temple piece, virtually indistinguishable therefrom during normal use. However, the spare hinge pin member can be interchanged with a primary hinge pin member in the event that a primary hinge pin member breaks.

In one broad aspect the present invention is an article of eye wear comprising a lens frame formed of a pair of eyepiece sections which define mutually engageable knuckles that are releasably coupled together in interleaved fashion. The eyepiece sections are of modular design. That is, an eyepiece section designed for wear in front of a right eye can be modularly interchanged with any number of different eyepiece sections which are also adapted for placement in front of the right eye.

Each of the eyepiece sections includes a hinge connection remote from the knuckles that join the eyepiece sections together. A pair of temple pieces having hinge pin connectors are provided for the two eyepiece sections. At least one of the temple pieces defines a receptacle for accommodating a spare hinge pin remote from the primary hinge pin connector thereof. A pair of primary hinge pin members engage the hinge pin connectors of the temple pieces and the eyepiece sections together. A replacement hinge pin is releasably carried in the receptacle in the temple piece and is adapted for coupling a hinge pin connection of an eyepiece section to a hinge pin connection of a temple piece.

The knuckles joining the lens sections together are secured by a tight, friction fit, preferably in mutually interlocking engagement. The knuckle elements are formed with enlarged, rounded tips which prevent the interengaging mating knuckle elements from being pulled apart by tensile forces exerted laterally upon the lens sections. The lens sections are assembled together by aligning the sets of knuckles in different, parallel planes, and by moving the lens sections relative to each other into a common plane. The rounded tips of the knuckle elements present a minimal hazard to the eyes of the wearer should a lens section be abruptly forced toward the eye of the wearer, as might occur should the wearer be accidentally struck in the face.

In another aspect the invention may be considered to be an improvement in a set of spectacles. According to the improvement of the invention a pair of eyepiece sections are formed with sets of knuckles that are releasably interleaved to join the eyepiece sections together to form a lens frame. The knuckles preferably have knuckle elements with enlarged, rounded tips having smooth surfaces to effectuate mutually interlocking engagement between the pair of eyepiece sections. Each of the sets of knuckles includes upper knuckle elements and lower knuckle elements located beneath the upper knuckle elements. The lower knuckle elements are shorter in length than the upper knuckle elements. That is, the lower knuckle elements rest atop the bridge of the nose and are shorter in length than the knuckle elements which reside immediately beneath the brow of the wearer. The lengths of the knuckle elements decrease proceeding downwardly from the upper portion of the lens frame near the brow to the region of the lens frame at the bridge of the nose.

The invention may be described with greater clarity and particularity with reference to the accompanying drawings.

DESCRIPTION OF THE DRAWINGS

FIG. 1 is a perspective view of a preferred embodiment of the eye wear of the invention.

FIG. 2 is a front elevational view of the eye wear of FIG. 1.

FIG. 3 is a detail, partially broken away in section, taken along the lines 3—3 of FIG. 2.

FIG. 4 is an isolated perspective view of a spare hinge pin member employed in the eye wear of FIG. 1.

FIG. 5 is a transverse sectional view taken along the lines 5—5 of FIG. 4.

FIG. 6 is an isolated perspective view of a primary hinge pin member according to the invention.

FIG. 7 is a transverse sectional view taken along the lines 7—7 of FIG. 6.

FIG. 8 is a front elevational detail showing the configuration of the interlocking knuckles of the lens sections of the eye wear of FIG. 1.

FIG. 9 illustrates the manner of assembly of the lens sections of the eye wear of FIG. 1.

DESCRIPTION OF THE EMBODIMENT

FIG. 1 illustrates an article of eye wear according to the invention indicated generally at 10. The eye wear 10 is a set of spectacles comprising a lens frame indicated generally at 12 formed of a pair of releasably interlocking lens sections 14 and 16. Each of the lens sections 14 and 16 is adapted to hold a single lens 18. Each lens section 14 and 16 has a rearwardly extending hinge connection 20, one of which is visible in FIG. 3. Each lens section 14 and 16 is provided with a set of interleaved knuckle elements. The knuckle elements of the lens section 14 are indicated at 22, 24 and 26, while the same knuckle elements of the lens section 16 are indicated at 23, 25 and 27. The knuckles of each lens section releasably interlock with the knuckles in the other lens section to releasably join the lens sections 14 and 16 together, as depicted in FIGS. 1, 2, 8 and 9.

The eye wear 10 is also formed with a pair of temple pieces or bows 28 and 30. Each of the bows 28 and 30 has a hinge connection 32 for mating hinged engagement with the hinge connections 20 of the lens holding sections 14 and 16. A pair of primary hinge pin members 34 and 36 are provided for engaging the hinge connections 32 of the temple pieces 28 and 30 to the hinge connections 20 of their associated eyepiece sections 14 and 16, respectively. That is, one primary hinge pin member 34 is used to couple the hinge pin connector 32 of the temple piece 28 to the hinge pin connector 20 of the lens section 14. The other primary hinge pin member 36 is used to engage the hinge pin connector 32 of the temple piece 30 to the hinge connector 20 of the lens section 16, as illustrated in FIG. 3. The primary hinge pin members 34 and 36 join the temple pieces 28 and 30 to the lens frame 12 at releasable hinge connections so that the temple pieces 28 and 30 can be folded back against the rear side of the lens frame 12 in a conventional manner.

The set of knuckles on the lens section 14 includes the laterally projecting knuckle elements 22, 24 and 26, while the set of knuckles on the lens section 16 includes the laterally projecting knuckle elements 23, 25 and 27. The lowermost knuckle elements 26 and 27 in each set are shorter in length than the knuckle elements 24 and 25 located immediately thereabove, which in turn are shorter than the uppermost knuckle elements 22 and 23.

The knuckle elements in each set are formed with bulbous, enlarged tips 64 which are held at the ends of interleavable arms 66. As best illustrated in FIG. 8, the arms 66 in each of the sets of knuckles are formed in different lengths. The knuckle elements in each set decrease in length proceeding downwardly from the upper edge 68 of the lens frame 12 which resides against the brow of the wearer toward the lower edge 70 thereof, which rests atop the bridge of the nose of the wearer. The bulbous tips 64 are of a circular arcuate configuration extending through an arc of about two hundred fifteen degrees.

The modular lens sections 14 and 16 are joined together by knuckle sets in interlocking engagement by positioning the lens sections 14 and 16 in alignment with each other in parallel but transversely separate planes, as illustrated in FIG. 9, and by then moving the lens sections 14 and 16 transversely into a common plane. The bulbous tips 64 of the knuckle elements 22-27 projecting from each lens section are entrapped and locked into the structure of the other lens section. The lens sections 14 and 16 thereby cannot be separated from each other by lateral tensile forces acting toward the hinge connections 20 in directions parallel to the arms 66 of the knuckle elements.

The knuckle elements are sized so as to be held tightly together by a frictional fit. Nevertheless, if it is desired to replace a lens sections 14 or 16, the adjacent lens sections can be separated by transverse forces which move the lens sections 14 and 16 into different but parallel planes, as illustrated in FIG. 9. The primary hinge pin member 34 or 36 associated with the lens section to be replaced is then removed. A substitute lens section is then installed in the manner previously described. The substitute lens section may be of the same or a different color. The sets of knuckles are then aligned in interleaved fashion and forced into the same plane from the alignment of FIG. 9 to the alignment of FIG. 1. The hinge pin 34 or 36 that was removed is then replaced.

Because the tips 64 of the knuckle elements 22-27 do not present any sharp corners or edges and are smooth and rounded, they do not present a hazard to the eyes of a wearer. Potential damage to the eyes of a wearer is thereby minimized should the knuckle elements suddenly separate, as might occur if the wearer is hit in the face with a volleyball, or other object.

The primary hinge pin members 34 and 36 are identical in structure. The hinge pin member 34 is depicted in isolation in FIG. 6. Each primary hinge pin member 34 and 36 is constructed of molded plastic and has an enlarged base 38 at its top and a cylindrical hinge pin shank or rod 40 that extends downwardly from the base 38. The base 38 is of uniform oblong cross section throughout its length and has rounded front and back edges 42 and 43, as illustrated in FIG. 7. The configuration and finish of the exposed surfaces of the bases 38 of the primary hinge pins 34 and 36 matches the surface configuration and finish of the temple pieces 28 and 30, so that the presence of the primary hinge pin connectors 34 and 36 in the temple pieces 28 and 30 is not easily detected.

As best illustrated in FIG. 1, the temple pieces 28 and 30 are both formed with seats 46 at the hinge pin connectors 32 to receive the bases 38 of the primary hinge pin members 34 and 36. Vertically aligned cylindrical openings 48 extend downwardly from the seats 46 through the hinge pin connectors 20 and 32 to receive the hinge pin shanks 40 of the primary hinge pin members 34 and 36.

In addition to the seats 46, each of the temple pieces 28 and 30 is formed with a receptacle 50 for accommodating a hinge pin remote from the hinge pin connector 32 thereof. Each receptacle 50 is formed as a recessed seat 52 that is identical in configuration to the seat 46. From the bottom of the seat 52 a cylindrical opening 54 extends downwardly from the seat 52 through the structure of the temple piece to accommodate a shank 62 of a spare hinge pin member 56 or 58. The diameter of the opening 54 is identical to the diameter of the openings 48.

The eye wear of the invention is provided with a least one spare or replacement hinge pin. In the embodiment illustrated, the eye wear 10 is provided with a pair of replacement hinge pins 56 and 58 which are of identical size and geometric configuration. The replacement hinge pins 56 and 58 are releasably carried in the receptacles 50 in the temple pieces 28 and 30. The replacement hinge pins 56 and 58 are adapted for coupling a hinge connector 20 of an eyepiece section to a hinge connector 32 of a temple piece in place of one of the primary hinge pin members 34 or 36, should one of those primary hinge pin members become broken. Until required as a replacement, however, the replacement hinge connectors 56 and 58 serve as spare hinge pins and are carried in the spare hinge pin receptacles 50.

Each of the replacement hinge pin connectors 56 and 58 has an enlarged base 60 and a hinge pin shank 62 that extends downwardly from the base 38. The height and longitudinal dimension of the bases 60 of the replacement hinge pin connectors 56 and 58 are identical to those of the bases 38 of the primary hinge pin members 34 and 36. That is, the cross section of the head 60 of each replacement hinge pin connector 56 and 58, illustrated in FIG. 5, is identical to the cross section of each head 38 of the primary hinge pin members 34 and 36, illustrated in FIG. 7. The primary hinge pin members 34 and 36 and the replacement or spare hinge pin members 56 and 58 are therefore all adapted to be received interchangeably in the seats 46 and 50 in the temple pieces 28 and 30.

The end of the base 60 of each hinge pin member 56 and 58 remote from the hinge pin shank 40 serves as a cross piece to which a flat, decorate shield 65 is attached, as illustrated in FIG. 4. The decorative shield 65 may contain any manufacturer's design or logo, or any other desired decoration, either molded or painted or otherwise impressed on its outwardly facing surface. The decorative shield 65 is attached at its upper region to the replacement hinge pin base 60 and resides in a vertical plane parallel to the hinge pin shank 62. As illustrated in FIGS. 1 and 8 the decorative shields 65 of the replacement hinge pin members 34 and 36 are both adapted to reside in disposition against the outside surfaces of the temple pieces 28 and 30 in which they are seated. The back sides of the shields 65 are disposed against the outwardly facing surfaces of the temple pieces 28 and 30.

Each spare hinge pin member 56 and 58 is available for use to replace any primary hinge pin member 34 or 36 should one of the primary hinge pin members 34 or 36 become broken. Until required for use, however, the spare replacement hinge pin connectors 56 and 58 are carried tightly but removably seated in the seats 50 in the temple pieces 28 and 30.

In the event of a fracture of the cylindrical hinge pin shank 40 of the primary hinge pin element 34, for example, the broken portions of the primary hinge pin member 34 are first removed from the seat 46 and from the connector 32 of the temple piece 28 and the hinge connector 20 of the lens section 14. The replacement hinge pin member 56 is then lifted from the seat 50. Because the head 60 of the replacement hinge pin member 56 conforms so closely to the contour of the seat 52 of the spare hinge pin receptacle 50, it may be necessary to use a sharp bladed instrument, such as a small screw driver, to pry the spare hinge pin member 56 out of the seat 50 in the temple piece 28.

The spare hinge pin member 56 is then inserted into the seat 46 in the temple piece 28. The shank 62 of the replacement hinge pin member 56 is forced downwardly into the openings 48 in the connectors 32 and 20 of the temple piece 28 and lens section 14, respectively. Because the cross sections of the bases 38 and 60 of the primary and spare hinge pin members are identical, the base 60 of the spare hinge pin member 56 will reside snugly in contact with the seat 46 in the temple piece 28.

Once the hinge has been repaired, any projecting stub portion of the shank 40 of the broken primary hinge pin member 34 is then inserted downwardly into the opening 54 in the receptacle 50 of the temple piece 28. The base 38 is thereupon pressed downwardly so as to rest snugly in the seat 52 of the receptacle 50. The base 38 of the remnant of the primary hinge pin member 34 thereby fills the cavity of the receptacle 50 to preserve the aesthetical appearance of the eye wear 10. Repair of the eye wear 10 can thus be completed in a matter of moments without the necessity of purchasing an additional replacement parts.

Lens sections 14 and 16 and temple pieces 28 and 30 of different colors and designs can be combined to form the eye wear article 10 to suit the wearer. These pieces may be sold together as a unit, or purchased individually. The wearer thus has a wide option of choices of styles and colors from which to choose.

Undoubtedly, numerous variations and modifications of the invention will become readily apparent to those familiar with eye wear. Accordingly, the scope of the invention should not be construed as limited to the specific embodiment thereof depicted and described herein, but rather is defined in the claims appended hereto.

We claim:

1. An article of eye wear comprising a lens frame formed of a pair of eyepiece sections each of which defines a plurality of mutually engageable interlockable arms each arm having a uniform horizontal thickness throughout formed with ends enlarged in the vertical direction and wherein said ends are interlockable such that said arms are releasably coupled together in interleaved fashion above the bridge of the nose of a wearer.

2. An article of eyewear comprising a lens frame formed of a pair of eye piece sections which define mutually engageable knuckles that are releasably coupled together in interleaved fashion and in which each of said eyepiece sections includes a hinge connector remote from said knuckles and further comprising a pair of temple pieces having hinge connectors, at least one of which temple pieces define a receptacle for accommodating a hinge pin remote from said hinge connector thereof, a pair of primary hinge pin members engaging said hinge pin connectors of said temple pieces and said eyepiece sections together, and a replacement hinge pin member releasably carried in said receptacle and adapted for coupling a hinge pin connector of an eyepiece section to a hinge pin connector of a temple piece.

3. An article according to claim 2 wherein both said primary hinge pin members and said replacement hinge pin member are formed with enlarged bases and hinge pin shanks that extend downwardly from said bases, and said hinge pin receptacle is formed as a recessed seat in at least one of said temple pieces and an opening from said seat into said temple piece in which said seat is formed, whereby said opening is adapted to receive said shank of said replacement hinge pin member.

4. An article according to claim 3 wherein said temple pieces are both formed with seats at said hinge pin connectors to receive said bases of said primary hinge pin members, and said bases of said primary and replacement hinge pin members are of a uniform width and are all adapted to be received interchangeably in said seats in said temple pieces at said hinge pin connectors.

5. An article according to claim 4 wherein at least one selected primary hinge pin member is provided with a decorative shield attached to said base thereof and adapted to reside in disposition beside a temple piece in which said selected primary hinge pin member is seated.

6. An article according to claim 1 wherein said arms are formed in lengths that decrease proceeding downwardly from the upper portion of said lens frame.

7. In a set of spectacles the improvement comprising a pair of eyepiece sections formed with sets of a plurality of arms each arm having a uniform horizontal thickness throughout said arms being releasably interleaved to join said eyepiece sections together to form a lens frame and which have ends enlarged in the vertical direction to effectuate mutually interlocking engagement between said eyepiece sections atop the bridge of the nose of the wearer.

8. A set of spectacles according to claim 7 wherein each of said sets of knuckles includes upper knuckle elements and lower knuckle elements located thereneath, and said lower knuckle elements are shorter in length than said upper knuckle elements.

9. A set of spectacles according to claim 7 further comprising temple pieces connected to said eyepiece sections at releasable hinge connectors by means of primary hinge pin members and further comprising a spare hinge pin member removably seated in one of said temple pieces and adapted to replace one of said primary hinge pin elements.

10. A set of spectacles according to claim 9 wherein at least one of said hinge pin members includes a shield disposed to face outwardly from a temple piece at which it is located.

11. A set of spectacles comprising a lens frame formed of a pair of releasably interlocking lens holding sections each adapted to hold a single lens and each having a hinge connection and a set of knuckles whereby the knuckles in each of said lens sections releasably interlock with the knuckles in the other lens section to releasably join said lens sections together, a pair of temple pieces each having a hinge connection for mating hinged engagement with said hinge connections of said lens holding sections and wherein a spare hinge pin receptacle is defined in at least one of said temple pieces, a pair of primary hinge pin members releasably joining said hinge connections of said lens holding sections to said hinge connections of said temple pieces, and at least one spare hinge pin member carried in said spare hinge pin receptacle and adapted to join hinge connections of said lens holding sections and said temple pieces together.

12. A set of spectacles according to claim 11 wherein said knuckles in each set are formed with bulbous tips held at the ends of interleavable arms.

13. A set of spectacles according to claim 12 wherein said arms in each of said sets of knuckles are formed in different lengths.

* * * * *